Figure 1:
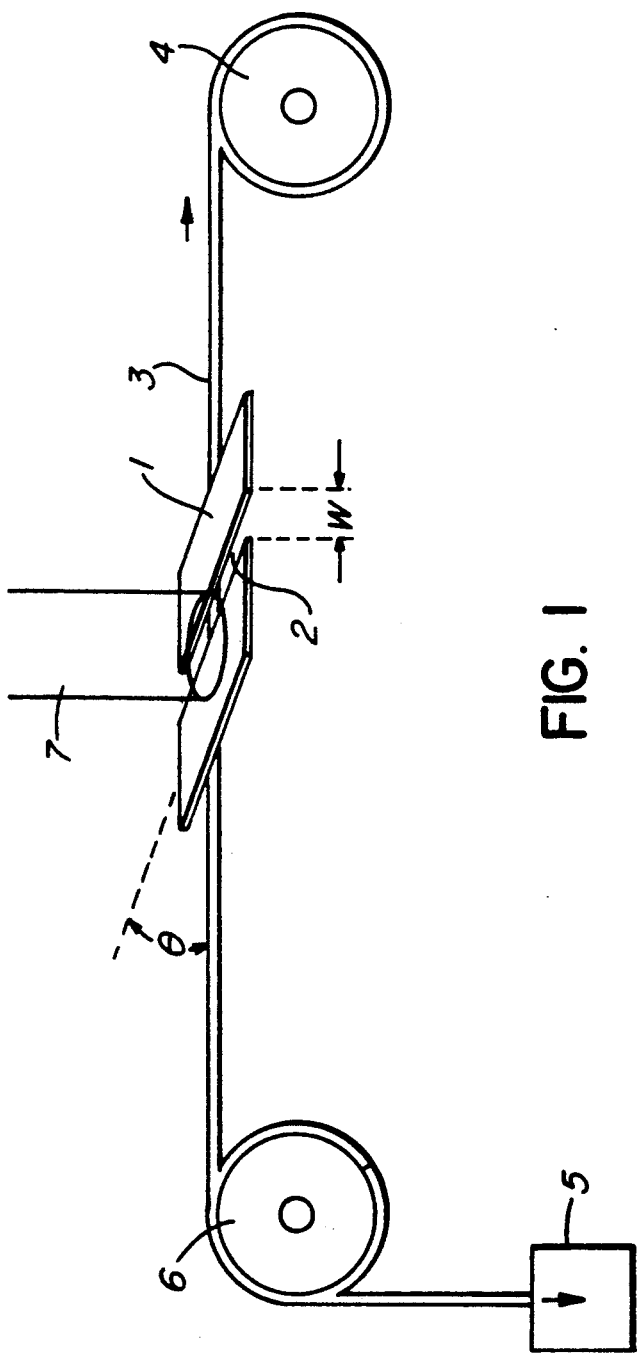

United States Patent [19]

Hill et al.

[11] Patent Number: 5,104,209
[45] Date of Patent: Apr. 14, 1992

[54] METHOD OF CREATING AN INDEX GRATING IN AN OPTICAL FIBER AND A MODE CONVERTER USING THE INDEX GRATING

[75] Inventors: Kenneth O. Hill, Kanata; Bernard Malo, Gatineau; Francois Bilodeau; Derwyn C. Johnson, both of Nepean, all of Canada

[73] Assignee: Her Majesty the Queen in right of Canada, as represented by the Minister of Communications, Ottawa, Canada

[21] Appl. No.: 656,462

[22] Filed: Feb. 19, 1991

[51] Int. Cl.⁵ .................. G02B 27/00; G02B 6/34; G02B 27/42
[52] U.S. Cl. ......................... 385/27; 385/37; 359/569
[58] Field of Search ............... 350/96.19, 96.15, 96.29, 350/96.30, 320, 3.61, 162.16, 162.17

[56] References Cited

U.S. PATENT DOCUMENTS

| | | | |
|---|---|---|---|
| 4,371,264 | 2/1983 | Lacombat et al. | 350/162.12 X |
| 4,725,110 | 2/1988 | Glenn et al. | 350/96.23 X |
| 4,807,950 | 2/1989 | Glenn et al. | 350/96.19 X |
| 4,974,930 | 12/1990 | Blyler, Jr. et al. | 350/96.19 X |
| 4,986,623 | 1/1991 | Sorin | 350/96.19 X |

*Primary Examiner*—Akm Ullah
*Attorney, Agent, or Firm*—Pascal & Associates

[57] ABSTRACT

This invention relates to a method of creating an index grating in an optical fiber comprising disposing a slit mask containing one or more slits over a side of an optical fiber, illuminating the fiber through the slit mask by substantially monochromatic ultraviolet light for a short interval, whereby an index grating line is created and stored in the core of the fiber.

25 Claims, 3 Drawing Sheets

METHOD OF CREATING AN INDEX GRATING IN AN OPTICAL FIBER AND A MODE CONVERTER USING THE INDEX GRATING

FIELD OF THE INVENTION

This invention relates to optical fibers and in particular to a method of making a refractive index grating in an optical fiber. It also relates to optical fiber mode converters.

BACKGROUND TO THE INVENTION:

Light induced refractive index changes in the core of an optical fiber were first observed in Ge-doped optical fibers, as described in Applied Physics Letters 32(10), pp 647–649, 1978 "Photosensitivity in Optical Fiber Waveguides: Application to Filter Fabrication" by K.O. Hill et Oct. 2nd, 1984. To produce the changes, light having a wavelength in the visible region was launched into the core of a Ge-doped fiber strand. The light was reflected from the end of the fiber. The forward propagating light interfered with the backward propagating light to form a standing wave pattern with a period corresponding to half the wavelength of the writing light. Through a photosensitive effect in the fiber, a refractive index grating having this period was written in the core of the fiber.

With the above technique, gratings could only be fabricated with reflected light having wavelengths close to that of the writing light. An improvement to that process was described in U.S. Pat. No. 4,807,950 issued Feb. 28th, 1989. In that patent the gratings were produced in the fiber by illuminating the fiber from the side with coherent ultraviolet radiation of 245 nm wavelength. By using two light beams, an interference pattern is set up along the length of the fiber. The period of the pattern could be controlled by controlling the angles of the interfering beams. Therefore index gratings could be written in the fiber which would reflect light at longer wavelengths.

A fiber optic converter was created by impressing periodic microbends in the fiber along its length, at a correct period between bends to induce mode coupling. The microbends were usually induced by laying a flat metal block with fine parallel grooves over the fiber. Another approach was to launch into a two-mode fiber light with high power in both modes. The interference pattern of the two propagating modes induced in the fiber core a permanent index of diffraction grating of the correct period for mode coupling. If light is now launched into one of the modes of the two mode fiber, the index grating couples it with the other mode.

SUMMARY OF THE INVENTION

In accordance with the present invention an index grating is produced in the core of a fiber by illuminating the fiber from the side using an ultraviolet light beam through a mask containing a slit. In the case of $LP_{01} \leftrightarrow LP_{11}$ mode converters the mask is preferably angled to the axis of the fiber at a predetermined blaze angle. In this manner a single refractive index line with a width approximately equal to the slit width is written in the core of the fiber. By moving the fiber and mask with the light beam relative to each other, and periodically flashing the light beam, the other lines of an index grating is written in the fiber.

In general, an embodiment of the invention is a method of creating an index grating in an optical fiber comprising the steps of disposing a slit mask containing one or more slits over a side of an optical fiber, and illuminating the fiber through the slit mask by substantially monochromatically ultraviolet light for a short interval whereby an index grating is created in the fiber.

It is believed that the index grating line is created by the generation of colour centers in the glass of the optical fiber.

Another embodiment of the invention is a mode-converter, created by the method described herein. The function of a mode-converter is to convert light propagating in one mode of a waveguide to another mode of the waveguide. Mode converters are fabricated by inducing an index of refraction perturbation along the fiber at a period that is suitable for coupling light between the selected fiber modes.

In the present invention the mode converter is fabricated using the methods described herein, resulting in a fiber mode converter comprised of an optical fiber containing an index grating using the steps described above.

In another embodiment a fiber optic mode converter using a non Ge-doped fiber is described.

BRIEF INTRODUCTION TO THE DRAWINGS

Figure 1A:
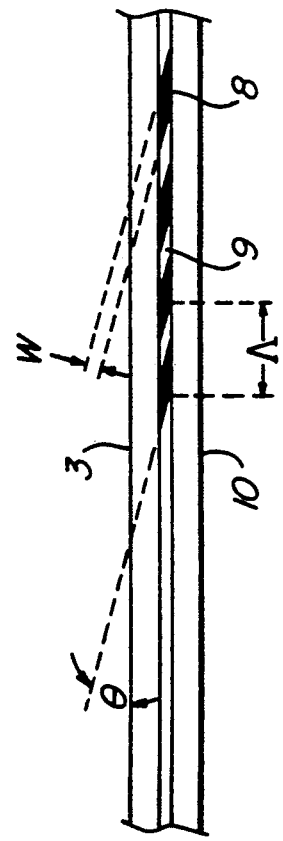
Figure 2:
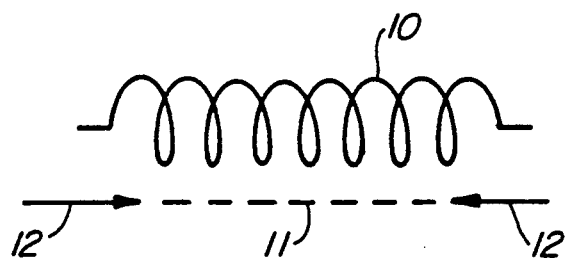
Figure 3:
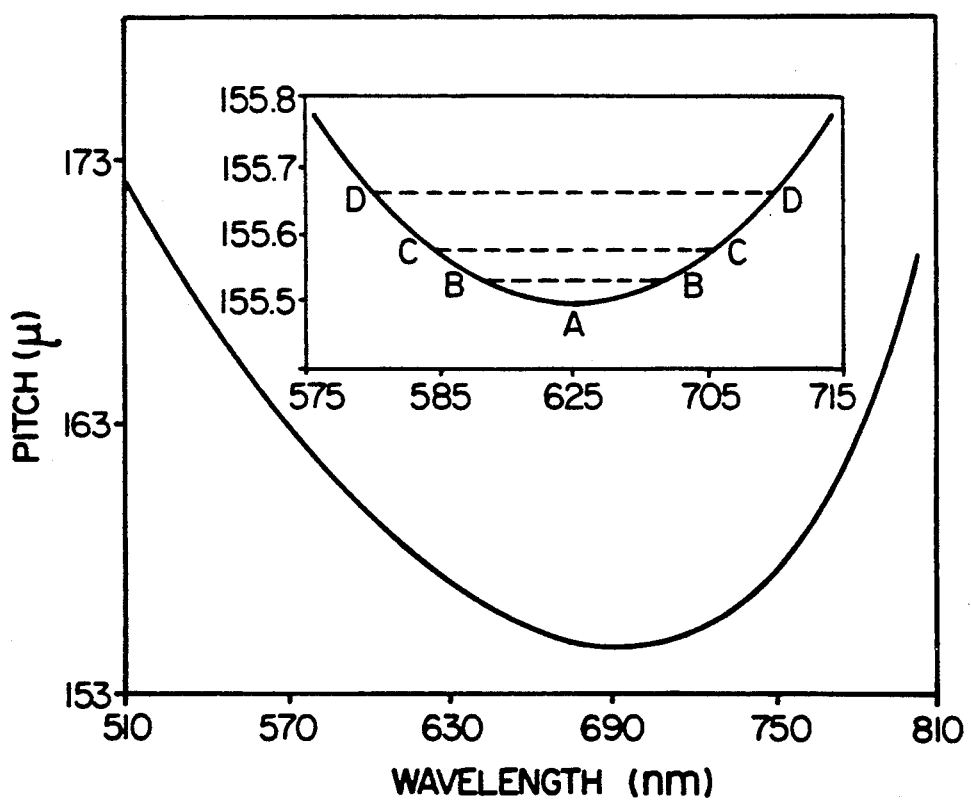
Figure 4:
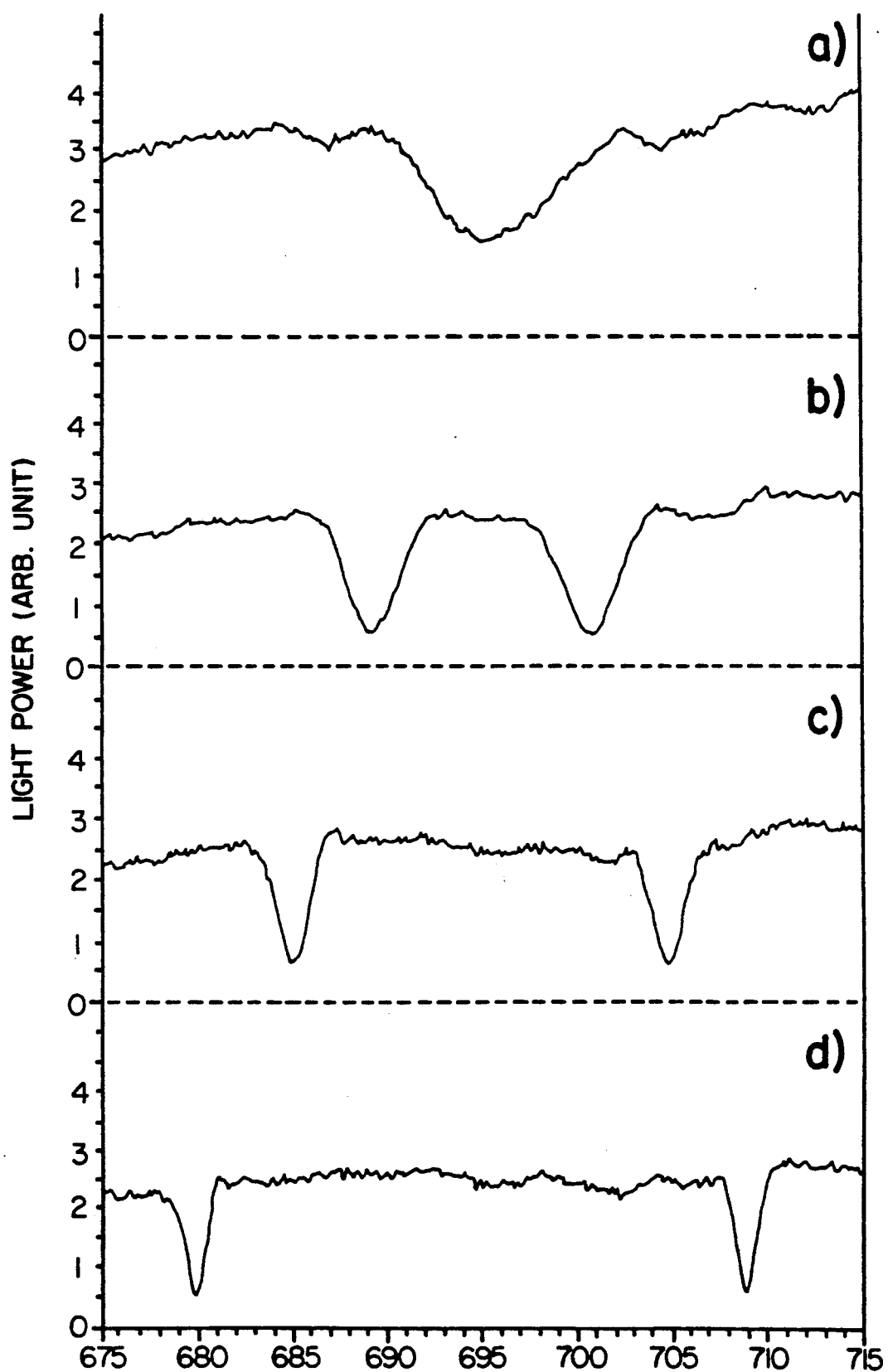

A better understanding of the invention will be obtained by reference to the detailed description below, in conjunction with the following drawings, in which:

FIGS. 1 and 1A are schematic partly perspective view of the invention and apparatus used to fabricate it, FIG. 2 illustrates use of the invention to create thermoluminescence, FIG. 3 are curves of calculated wavelength dependence of the grating period for an $LP_{01}$ to $LP_{02}$ mode converter, and FIG. 4 are curves of spectral response of intermodal $LP_{01}$–$LP_{02}$ coupling as the grating is tuned by stretching.

DESCRIPTION OF THE INVENTION:

FIG. 1 illustrates apparatus used in the manufacture of the index grating, as well as an enlargement of a fiber portion containing the grating.

A mask I having a slit 2 is placed over and in contact with or very close to an optical fiber In order to handle the optical fiber, in producing a successful prototype, one end was wrapped around a cylinder 4 which had radius of 8.2 centimeters, the cylinder having been attached to the shaft of a precision dc motor (not shown). The other end of the fiber was attached to a weight 5, and passed over a pulley 6 having similar diameter as the cylinder 4.

An unfocused monochromatic ultraviolet light beam 7 is impinged on the optical fiber through the slit 2 in the mask. The angle $\theta$ of the edges of the slit, i.e. the blaze angle is predetermined to provide a proper grating blaze, as will be described below.

In a successful embodiment, the ultraviolet light was produced by a Lumonics series Te-260-2 Excimer laser. The active gas in the laser was KrF, producing ultraviolet light at 249 nm. The laser was pulsed once or several times to create a single grating line 8 in the core 9 of fiber 3. The core 9 is of course covered by cladding 10.

The laser pulse duration was 8 ns with an average energy of 240 mJ per pulse, a peak power of 30 MW and a cross-sectional area of 3 cm by 0.7 cm.

In order to produce a full grating the fiber and mask are moved axially relative to each other along the axis of the optical fiber. At the correct position for the next grating line, the light beam is pulsed. Either the mask can be moved or the fiber can be moved.

In a preferred embodiment, the motor turns and the straight portion of the fiber between the pulley and the rotary stage is translated in front of the slit. The motor stops at each required point (stepping) and a one or more laser pulses impinge on the fiber through the slit. Alternatively the motor can turn continuously and the laser flashed at regular intervals. The accuracy of the grating in the first case depends on the positional accuracy of the motor. In the second case the uniformity of the motor speed and of the laser flashes determine the grating accuracy.

Different grating periods can be used to fabricate gratings for producing mode converters, for example, at different wavelengths. Mode conversion gratings at about ten different wavelengths were successfully fabricated in the 600 nm to 900 nm region. The increased index of refraction produced by the ultraviolet radiation at every grating step was large enough to produce 100% coupling efficiency after 200-300 steps (200-300 lines). The spectral response of such a grating has been found to be fairly broad. To produce a narrower response gratings were fabricated with up to 1,000 steps. This produced an over-coupled grating. After 100% of the $LP_{01}$ mode constituent is coupled to an $LP_{11}$ mode constituent, the same periodicity grating then converts the light back to $LP_{01}$ mode constituent.

The grating was heat treated by the use of a heating wire in one case, and a heating coil in another case, to partly erase and thus reduce the amplitude of the index of refraction grating. After heating, the desired grating coupling strength was found to be achieved.

It should be noted that by heating the optical fiber to a sufficiently high temperature, the index grating could be erased. Thus the present invention provides a technique not only for writing the index grating but also for erasing it.

The gratings were produced in Corning Telecommunication fiber having cut-off wavelength at 1.1 μm. A pitch of 590 μm gave a $LP_{01} \leftrightarrow LP_{11}$ mode conversion grating of 820 nm in first order. Efficient intermodal coupling requires not only a grating of the correct period but also that the individual index perturbations should be blazed, i.e. tilted, so that the interface plane between perturbed and unperturbed index regions is blazed at about 2°-3° to the optical fiber axis. The blaze angle at which this grating was written is determined by the beat characteristics of the $LP_{01}$ and the $LP_{11}$ modes of the fiber. The need for a blaze can be understood in terms of holography by considering the $LP_{01}$ mode as the reference beam and the $LP_{11}$ as the object beam. The interference of these two modes traces out as a function of position along the length of the fiber an intensity distribution that is maximum first on one side of the fiber core and then on the other side as the phase difference between the two modes increases by $\pi$. The refractive index variation of an ideal grating would duplicate this intensity distribution substantially exactly.

In a successful prototype, the beat characteristic was approximated by periodic exposure of the fiber core through a slit having width of 12 μm angled at an angle $\theta$ of 2°-3° with respect to the fiber axis, to provide the correct blaze for light at 820 nm. In this case the index perturbation in the fiber core would have an oblong or rhombic cross-sectional shape as shown in FIG. 1. To obtain mode conversion at other wavelengths both the period and blaze angle of the grating (as well as the slit width) should be appropriately adjusted. It was found that grating mode conversion efficiency is reduced considerably for blaze angles differing from the optimal blaze by as little as 1°. However it was determined that for certain mode conversions such as $LP_{01}-LP_{02}$ the blaze angle $\theta$ should be 90° to the fiber axis, i.e. no blaze, and the index perturbations would have a rectangular shape.

FIG. 2 illustrates photoluminescence resulting from heating of the fiber. A heating coil 10 is placed next to the fiber. It was found that as the fiber was heated, the regions (lines) of the optical fiber that were irradiated by ultraviolet light showed created thermoluminescence, indicated at 11 between the arrows 12—12. An actual photograph of the thermal luminescencing fiber was in inverse contrast to the drawing of FIG. 2.

The index grating pitch for a mode converter can be determined using the following relationship:

$$\Delta\beta\Lambda = 2\pi$$

where $\Lambda$ is the period of the grating, and $\Delta\beta$ is the difference in the propagation constants of the two modes that are desired to be coupled in the mode coupler created using the method of the present invention.

$\beta = (2\pi/\lambda) \times$ (the effective index of the mode).

The technique for determining the pitch of the grating is as follows:

1. Choose the wavelength $\lambda$ that the index grating is to resonate at.

2. $\beta$ for $LP_{01}$ and $LP_{02}$ at the chosen wavelength is then calculated.

3. $\Delta\beta$ for determining the pitch (period) $\Lambda$ is then calculated.

4. $\Lambda$, the index grating pitch is then calculated from the relationship given above.

5. The width W of the slit in the slit mask should be less than $\Lambda$.

It has been found that fiber cladding forms a cylindrical lens focusing the light toward the core of the fiber, thus reducing the effect of the mask being at various distances from the surface of the core.

The method described herein for creating the index grating can be used to fabricate Bragg reflectors in optical fiber or distributed feedback mirrors on the end of Er-doped optical fiber amplifier, thus providing a practical means for making a tunable narrow frequency laser. In this case the grating pitch $\Lambda$ is determined from $$\Lambda = \frac{1}{2} \frac{\lambda}{n_{eff}}$$

where $\lambda$ is the wavelength of the reflected light and $n_{eff}$ is the effective index at $\lambda$ for the $LP_{01}$ mode. Further, by writing a grating of an appropriate period, phase matching of the light waves in four photon processes can also be achieved. A fiber containing the index grating can be embedded in materials to provide a technique for monitoring the strains in a structure.

It should be noted that the invention is not restricted to a slit mask containing single slit. The mask could contain many slits. In this case it may be advantageous to insert imaging optics between the mask and the fiber in order to reduce the size of the image of the mask on the fiber and thereby provide a means for controlling the dimensions of the index grating.

It should also be noted that the invention is not restricted to Ge-doped optical fibers. It may be applicable to a variety of different fibers. For example, we have successfully created a index grating in Ge-free $Eu^{2+}$:$Al_2O_3$ doped core fiber. The fiber core diameter of 11.5 $\mu m$, cladding diameter of 124.8 $\mu m$ and numerical aperture 0.08 was fabricated using MCVD and the Brown University aerosol dopant delivery method.

Using the latter fiber, $LP_{01}$-$LP_{11}$ fiber mode conversion gratings were made having $\Lambda = 655$ $\mu m$ and $\theta = 2.5°$ blaze angle, approximately 30 cms long, using the fabrication technique herein described. The KrF Excimer laser source exposed the fiber. A successful prototype mode converter using the method described above converted light between the $LP_{01}$ and $LP_{11}$ modes operating in the 600-900 nm wavelength region. As originally made, the grating was overcoupled but then was partly heat-erased as described above to reduce the coupling to 50%, thereby achieving a cleaner spectral response. Gratings written with ultraviolet light began to be erased at the same temperature as in the case of Ge-doped fiber, i.e. at about 350° C. Complete erasure occurred at 500° C.

It appears also that at least metaphosphate, lithium borate and silicate bulk glasses, the latter incorporating various network modifiers, doped with $Eu^{3+}$ are useful to form fibers in which index gratings using the method described above can be made.

The index grating writing technique described above has the advantage that mode converters can be fabricated in standard optical fiber and operated at wavelengths appropriate to optical communication systems.

It has been observed that $LP_{01} \leftrightarrow LP_{11}$ mode converters have a complicated wavelength spectral response. The many peaks are a result of the $LP_{11}$ approximate mode corresponding to four true modes in a fiber, i.e. the fiber is not really bimodal. In the fabrication of practical two-mode optical fiber devices, a mode converter which operates in a narrow bandwidth about a single wavelength is preferable. Single peak spectral responses require two-mode fibers in which the higher order mode has only one mode constituent. This may be accomplished by using a special two-mode fiber, e.g. having an elliptical core, or by writing gratings that couple the $LP_{01}$ to the $LP_{02}$ mode where higher order mode $LP_{02}$ is a single mode. Such $LP_{01}$-$LP_{02}$ mode converters have been created using both the fabrication process described above.

To write the grating for the $LP_{01}$-$LP_{02}$ mode converter in a manner described with reference to FIG. 1, the technique that is used is similar to that used in the fabrication of the $LP_{01}$-$LP_{11}$ mode converter. The principal differences are that the grating pitch is selected to permit coupling between the $LP_{01}$ and $LP_{02}$ modes and the interface plane between the perturbed and unperturbed index regions is normal to the fiber axis, i.e. the gratings are not blazed and the edges of the mask slit are 90° to the axis of the fiber. Blazing is not required because both modes have circular symmetry.

The technique for determining the period of the grating is as described earlier.

FIG. 3 are graphs showing the wavelength dependence of the grating period for an $LP_{01}$ to $LP_{02}$ mode converter, which was computed numerically, for first order gratings in an optical fiber to yield intermodal coupling in the wavelength region 510 nm to 810 nm. Towards the longer wavelengths, the curve does not extend beyond 807 nm because the $LP_{02}$ is cut off. The curve also has a minimum period for which the phase matching condition $LP_{01}$-$LP_{02}$ ;intermodal coupling is satisfied. Thus for gratings that have a period shorter than the minimum period, intermodal coupling is not possible. On the other hand, for gratings having periods longer than the minimum period there can be two wavelengths for which intermodal coupling is achievable. For a grating having a period at the curve minimum $LP_{01}$-$LP_{02}$ intermodal coupling occurs at a single waveform.

A mode converter grating of length 1.7 m was written in an optical fiber with a pitch, $\Lambda$ of 155.5 $\mu m$, slightly shorter than the minimum wavelength. By stretching the fiber, the grating period could be tuned through the various phase matching regions of no coupling, single wavelength coupling, and two wavelength coupling. The results of measurements of spectral response of the intermodal coupling, as the grating is tuned by stretching, is shown in FIG. 4. With the grating pitch tuned to the minimum wavelength, intermodal coupling occurs at a single wavelength of 696 nm with an efficiency of 50% and a line width of 7 nm. An additional stretching of the fiber resulted in the appearance of two peaks in spectral response curves (curves b, c and d). The separation between the peaks increases with increasing applied tension to the fiber. At coupling efficiency of 70% and a line width of 1.2 nm was demonstrated.

Thus using the invention described herein, the first $LP_{01}$-$LP_{02}$ mode converter has been made based on a fiber index grating made by fiber photosensitivity. The mode converter has a simple highly selective spectral response which is useful in the fabrication of two-mode fiber devices.

Other applications of intermodal gratings in fibers can be in the characterization of optical fibers and as optical fiber sensors.

A person understanding this invention may now conceive of alternative structures and embodiments or variations of the above. All of those which fall within the scope of the claims appended hereto are considered to be part of the present invention.

WE CLAIM:

1. A method of creating an index grating in an optical fiber comprising:
    (a) disposing a slit mask containing one or more slits over a side of an optical fiber,
    (b) illuminating the fiber through the slit mask by substantially monochromatic ultraviolet light for a short interval, whereby an index grating line is created and stored in the core of the fiber.

2. A method as defined in claim 1 in which the slit mask is angled at a predetermined blaze angle relative to the axis of the optical fiber.

3. A method as defined in claim 2 including generating the ultraviolet light by means of a laser.

4. A method as defined in claim 1 further including stepping the relative positions of the optical fiber and the mask in a direction along the axis of the fiber and illuminating successive portions of the fiber following each with a pulse of said ultraviolet light to generate an index grating formed of plural spaced grating lines in said fiber.

5. A method as defined in claim 3 in which the wavelength of the light is 249 nm.

6. A method as defined in claim 3 in which the core of the optical fiber has an oval cross-section.

7. A method as defined in claim 3 including the further step of continuously moving the fiber axially relative to the mask and flashing the laser at predetermined intervals through said mask to generate an index grating formed of plural spaced grating lines in the core of said fiber.

8. A method as defined in claim 1, 3, 4 or 7 in which the optical fiber is Ge-doped.

9. A method as defined in claim 1, 3, 4 or 7 in which the optical fiber is Ge-free and is doped with $Eu^{+2}:Al_2O_3$.

10. A method as defined in claim 3 in which the blaze angle of the mask slit is about 2°–3° relative to the axis of the fiber.

11. A method as defined in claim 4 or 7, including heating a portion of the fiber containing the index grating to reduce the amplitude of the lines of the grating, thereby to optimize the coupling strength.

12. A method as defined in claim 4 or 7 including a further erasing step comprised of heating a portion of the fiber containing the index grating to a temperature sufficient to erase the lines of the diffraction grating.

13. A method as defined in claim 4 or 7 including the further step of heating a portion of the fiber containing the diffraction grating and obtaining thermoluminescence of the fiber over the interval of the heating diffraction grating.

14. A fiber mode converter comprised of an optical fiber having a core containing an index grating created using the steps
   (a) disposing a slit mask containing one or more slits over a side of an optical fiber,
   (b) illuminating the fiber through the slit mask by substantially monochromatic ultraviolet light for a short interval, whereby an index grating line is created and stored in the core of the fiber.

15. A fiber mode converter as defined in claim 14, in which the cross-section of the core is oval.

16. An optical fiber containing an index grating in which the core of the fiber is Ge-free and is comprised of $Eu^{2+}:Al_2O_3$ doping formed by the method
   (a) disposing a slit mask containing one or more slits over a side of an optical fiber,
   (b) illuminating the fiber through the slit mask by substantially monochromatic ultraviolet light for a short interval, whereby an index grating line is created and stored in the core of the fiber.

17. An $LP_{01}$–$LP_{02}$ fiber optic mode converter made by the method
   (a) disposing a slit mask containing one or more slits over a side of an optical fiber,
   (b) illuminating the fiber through the slit mask by substantially monochromatic ultraviolet light for a short interval, whereby an index grating line is created and stored in the core of the fiber.

18. A fiber mode converter comprised of an optical fiber having a core containing an index grating created using the steps
   (a) disposing a slit mask containing one or more slits over a side of an optical fiber,
   (b) illuminating the fiber through the slit mask by substantially monochromatic ultraviolet light for a short interval, whereby an index grating line is created and stored in the core of the fiber, and
   (c) stepping the relative positions of the optical fiber and the mask in a direction along the axis of the fiber and illuminating successive portions of the fiber following each with a pulse of said ultraviolet light to generate an index grating formed of plural spaced grating lines in said fiber.

19. A fiber mode converter comprised of an optical fiber having a core containing an index grating created using the steps
   (a) disposing a slit mask containing one or more slits over a side of an optical fiber, the slit mask being angled at a predetermined blaze angle relative to the axis of the optical fiber,
   (b) illuminating the fiber through the slit mask by substantially monochromatic ultraviolet light for a short interval, whereby an index grating line is created and stored in the core of the fiber, including generating the ultraviolet light by means of a laser, and
   (c) continuously moving the fiber axially relative to the mask and flashing the laser at predetermined intervals through said mask to generate an index grating formed of plural spaced grating lines in the core of said fiber.

20. An optical fiber containing an index grating in which the core of the fiber is Ge-free and is comprised of $Eu^{2+}:Al_2O_3$ doping formed by the method
   (a) disposing a slit mask containing one or more slits over a side of an optical fiber, the slit mask being angled at a predetermined blaze angle relative to the axis of the optical fiber,
   (b) illuminating the fiber through the slit mask by substantially monochromatic ultraviolet light for a short interval, whereby an index grating line is created and stored in the core of the fiber, and generating the ultraviolet light by means of a laser.

21. An optical fiber containing an index grating in which the core of the fiber is Ge-free and is comprised of $Eu^{2+}:AlO_3$ doping formed by the method
   (a) disposing a slit mask containing one or more slits over a side of an optical fiber,
   (b) illuminating the fiber through the slit mask by substantially monochromatic ultraviolet light for a short interval, whereby an index grating line is created and stored in the core of the fiber, and
   (c) stepping the relative positions of the optical fiber and the mask in a direction along the axis of the fiber and illuminating successive portions of the fiber following each with a pulse of said ultraviolet light to generate an index grating formed of plural spaced grating lines in said fiber.

22. An optical fiber containing an index grating in which the core of the fiber is Ge-free and is comprised of $Eu^{2+}:Al_2O_3$ doping formed by the method
   (a) disposing a slit mask containing one or more slits over a side of an optical fiber, the slit mask being angled at a predetermined blaze angle relative to the axis of the optical fiber,
   (b) illuminating the fiber through the slit mask by substantially monochromatic ultraviolet light for a short interval, whereby an index grating line is created and stored in the core of the fiber, and generating the ultraviolet light by means of a laser, and
   (c) continuously moving the fiber axially relative to the mask and flashing the laser at predetermined intervals through said mask to generate an index grating formed of plural spaced grating lines in the core of said fiber.

23. An $LP_{01}$-$LP_{02}$ fiber optic mode converter made by the method
  (a) disposing a slit mask containing one or more slits over a side of an optical fiber, wherein the slit mask is angled at a predetermined blaze angle relative to the axis of the optical fiber, and
  (b) illuminating the fiber through the slit mask by substantially monochromatic ultraviolet light for a short interval, whereby an index grating line is created and stored in the core of the fiber, and generating the ultraviolet light by means of a laser.

24. An $LP_{01}$-$LP_{02}$ fiber optic mode converter mode by the method
  (a) disposing a slit mask containing one or more slits over a side of an optical fiber,
  (b) illuminating the fiber through the slit mask by substantially monochromatic ultraviolet light for a short interval, whereby an index grating line is created and stored in the core of the fiber, and
  (c) stepping the relative positions of the optical fiber and the mask in a direction along the axis of the fiber and illuminating successive portions of the fiber following each with a pulse of said ultraviolet light to generate an index grating formed of plural spaced grating lines in said fiber.

25. An $LP_{01}$-$LP_{02}$ fiber optic mode converter made by the method
  (a) disposing a slit mask containing one or more slits over a side of an optical fiber, wherein the slit mask is angled at a predetermined blaze angle relative to the axis of the optical fiber,
  (b) illuminating the fiber through the slit mask by substantially monochromatic ultraviolet light for a short interval, whereby an index grating line is created and stored in the core of the fiber, and generating the ultraviolet light by means of a laser, and
  (c) continuously moving the fiber axially relative to the mask and flashing the laser at predetermined intervals through said mask to generate an index grating formed of plural spaced grating lines in the core of said fiber.

* * * * *